United States Patent [19]

Beckman

[11] 4,007,761
[45] Feb. 15, 1977

[54] PREPACKAGED SHIRRED TUBULAR CASING ARTICLE

[75] Inventor: John Heller Beckman, La Grange Park, Ill.

[73] Assignee: Union Carbide Corporation, New York, N.Y.

[22] Filed: Oct. 30, 1975

[21] Appl. No.: 627,253

[52] U.S. Cl. .............................. 138/103; 138/118.1; 17/33; 426/106; 426/135
[51] Int. Cl.² ........................................ F16L 11/00
[58] Field of Search ............ 17/41, 35, 33, 49, 42; 138/118.1, 103, 109, 121, 122; 99/450.7; 426/105, 140, 135; 53/197; 285/45, 114

[56] References Cited

UNITED STATES PATENTS

| 2,871,508 | 2/1959 | Hill | 17/41 |
|---|---|---|---|
| 3,639,130 | 2/1972 | Eichin et al. | 138/118.1 |
| 3,864,494 | 2/1975 | Kupcikevicius et al. | 426/105 X |

Primary Examiner—Houston S. Bell, Jr.
Attorney, Agent, or Firm—Clement J. Vicari

[57] ABSTRACT

A prepackaged shirred tubular casing article comprising a shirred casing length having a sizing means confined within an unshirred portion of said casing length, said sizing means having an outer perimeter larger than the inner perimeter of said unshirred casing length.

17 Claims, 7 Drawing Figures

U.S. Patent  Feb. 15, 1977  4,007,761
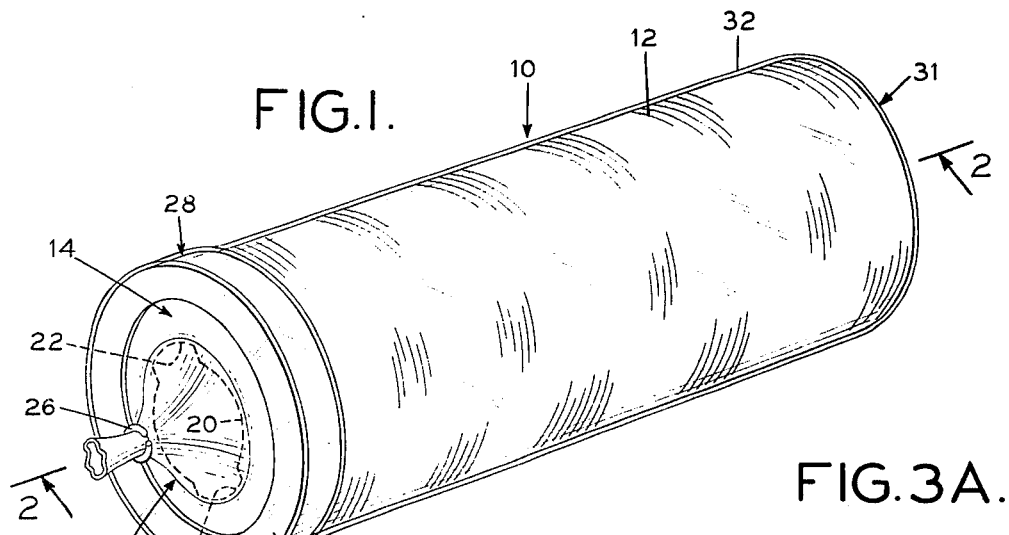
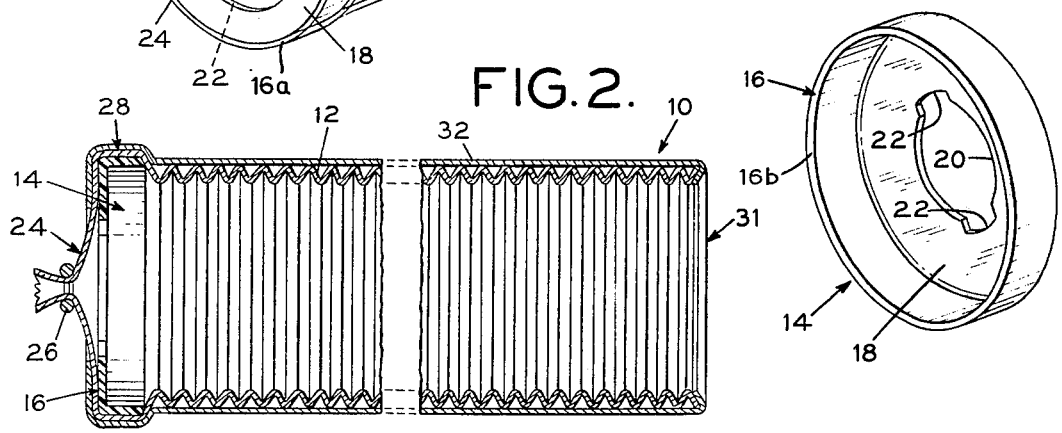
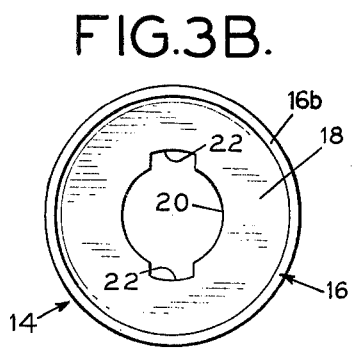
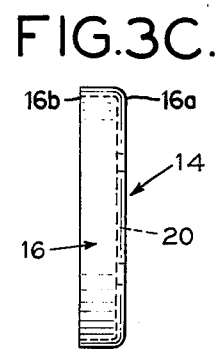
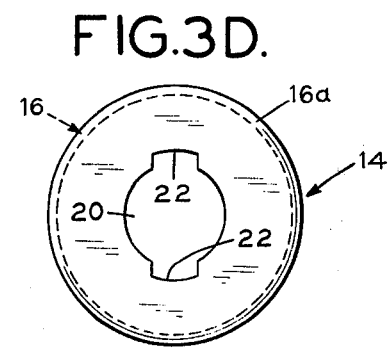
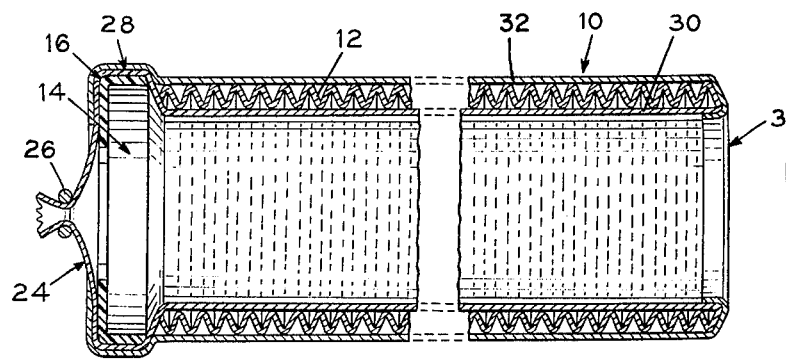

PREPACKAGED SHIRRED TUBULAR CASING ARTICLE

This invention relates to a prepackaged shirred tubular casing article for producing a stuffed product and more particularly to a prepackaged shirred tubular casing article which is provided with a sizing means which coacts with a stuffing apparatus to control the diameter of the resultant stuffed product.

In the meat packing industry, techniques are known for the automatic and semiautomatic filling of various types of casings with viscous meat emulsion. In general, these techniques include positioning a shirred continuous film casing length over a stuffing horn and thereafter continuously deshirring the casing and stuffing the deshirred casing with viscous meat emulsion fed under pressure through the stuffing horn and into the casing interior. As used herein, the term casing or tubular casing is intended to mean tubing of natural or manufactured materials, and the term "casing length" is intended to mean continuous tubular casing lengths. Shirred tubular casings are also known to persons familiar with the art as "sticks", such "sticks" being long lengths of casing having a substantially large bore, which have been shirred and compressed into short compact self-sustaining lengths, or which may be a package of shirred and compressed casing sheathed inside a retaining sleeve. Apparatus and processes are well known in the food casing art for producing shirred tubular cellulosic food casings such as, for example, the apparatus and processes disclosed in U.S. Pat. Nos. 2,983,949 and 2,984,574 to Matecki. These apparatus may be employed in the preparation of pleated and compressed tubular casings wherein the compression ratios (unshirred to shirred stick length) are in the order of at least about 40:1 and up to about 100:1 or even greater. Using suitable food stuffing machinery, casing lengths can be stuffed and formed into unit size links of particulate or comminuted viscous materials, such as meat emulsions, or the like.

In the art of producing sausages and similar food products, the finely divided meat compositions commonly referred to as emulsions, are conventionally stuffed into the tubular casing materials of long length which, as stated above, may be of natural or manufactured materials. Large sausage products used in slicing for multislice package putup are usually made in casings which range in size from the trade designation No. 6 (101 mm. diameter) to No. 9 (129 mm. diameter). In the production of large sausage products, a clip closed end casing of precut length is first manually sheathed over the end of a stuffing horn and then stuffed with a food emulsion. The stuffed casing is then tied, twisted or clipped into predetermined unit length cylindrical packages.

The thusly stuffed and encased food emulsion is subsequently cooked and cured according to conventional processes. A large percentage of these large sausage products are thereafter sliced and packaged into units of predetermined weight and slice count for retail sale. The high speed slicing devices employed in such packaging operations are pre-set to yield a specific weight-by-slice count for use in obtaining unit packages of equal weight. Therefore an important aspect of a commercially acceptable large sausage product is that the tubular finished processed sausage product have a substantially uniform diameter from end to end and in successive pieces of the same designated size. Moreover, the diameter of the slices must be uniformly precise in order to assure that the slices will fit into the preformed rigid packaging frequently used.

Since a large sausage casing stuffed with a food emulsion has two generally hemispherical, rounded ends, these rounded ends are generally not used in producing equal weight packages and are either discarded or reworked. Thus another aspect of importance commercially, is to have a large sausage casing stuffed with uniform tight ends, to thereby minimize the amount of food product cut-off from the cylindrical portion.

Years of commercial utilization of manufactured sausage casings such as prepared from unsupported or fibrous reinforced cellulose have provided the experience for determining optimum stuffing and processing conditions for various classes of sausage product. Sausage generally needs to be encased or stuffed to "green" or unprocessed diameters that have been selected and recommended for such optimum performance. The recommended stuffing diameter for each size and type of casing has been established and tabulated in recommended operating procedures determined by the casing manufacturer for guidance of the sausage maker.

When a casing is understuffed from the recommended green diameter, the result generally is a processed product that is not uniform in diameter from end to end and from piece to piece; the product is undesirably wrinkled in appearance; and the processed sausage may have an emulsion breakdown yielding undesirable pockets of fat or liquid.

When a casing is overstuffed from the recommended green diameter, the casing may split or break apart at the stuffing station or subsequently, in transport to or in the cooking/smoking processing operations. This results in a costly waste of meat and in the labor expense for cleanup.

For many years, the apparatus and methods employed to prepare the encased food products, and particularly food products encased in large diameter casing, have relied upon manual manipulation in controlling the stuffing of food emulsion into predetermined length sausage links or packages. Recently, advances in the art have resulted in the introduction of apparatus for machine control of the stuffing operation which have provided means for preparing uniformly sized encased products such as disclosed, for example, in U.S. Pat. Nos. 2,871,508, 2,999,270, 3,264,679, 3,317,950, 3,454,980, 3,457,588, 3,553,769, 3,621,513, 3,659,317 and 3,751,764.

Although many of the prior art stuffing devices generally provide a fairly wide range of adjustment for producing stuffed casings of desired diameter, the adjustments are usually left to the judgement of the operator, thereby resulting in understuffing or overstuffing caused by deviation from the optimum size recommended by the casing manufacturer. In addition, the prior art devices do not have means for controlling the shape and tightness of stuffing for both the leading and trailing ends of the stuffed casing.

In the copending application of V. Kupcikevicius and A. L. Mika, Ser. No. 627,252 having a common assignee and which was filed concurrently herewith, there is disclosed an apparatus for controlling the uniformity of stuffed diameter and conformation of the terminal ends of a sausage product. The shirred tubular casing article of the instant invention is particularly adapted for use in the apparatus disclosed therein.

It is therefore an object of the present invention to provide a prepackaged shirred tubular casing article equipped with a sizing means which coacts with a stuffing apparatus to control the diameter of the stuffed sausage product.

Another object is to provide a prepackaged shirred tubular casing article which allows an operator to change the basic diameter to stuffed product without modifying or adjusting the stuffing apparatus when changing the size of casing used.

A further object is to provide a prepackaged shirred tubular casing article which coacts with a stuffing apparatus to substantially reduce the tendency to overstuff or understuff a sausage product.

A further object is to provide a prepackaged, self-sustaining tubular casing article equipped with sizing means, which is compact, uniform, and which is capable of retaining the sizing means in a relatively fixed position with reference to the other elements of the article.

A still further object is to provide a prepackaged shirred tubular casing article which coacts with a stuffing apparatus to provide controlled shape of the leading and trailing ends of a stuffed product.

These and other objects will become apparent from the following description of the invention taken in conjunction with the accompanying drawings in which:

FIG. 1 is a perspective view of a preferred embodiment of the shirred tubular casing article of the present invention.

FIG. 2 is a longitudinal section taken along the lines 2—2 of FIG. 1.

FIGS. 3A, 3B, 3C, and 3D show a perspective, rear view, side view and front view of the sizing means respectively.

FIG. 4 is a cross-sectional view of another embodiment showing the aft end of a casing length passing through the bore of the shirred casing length and thence around the sizing means.

In accordance with the present invention there is provided a prepackaged shirred tubular casing article comprising a shirred casing length having an internal bore, and a sizing means confined within an unshirred portion of said casing length, said sizing means having an outer perimeter larger than the inner perimeter of said unshirred casing length.

As mentioned previously, the shirred tubular casing article of the instant invention is particularly adapted for use in the apparatus disclosed in copending application Ser. No. 627,252 and the disclosure therein is incorporated herein by reference.

In general, however, the apparatus disclosed therein is an apparatus for controlling the uniformity of stuffed diameter and conformation of the terminal ends of a food product such as a sausage product comprising in combination, a frame, a stuffing horn assembly including a central support tube having an inlet end and a discharge end for conveying food emulsion from a supply source, and sleeve means movably mounted with respect to said support tube. The shirred tubular casing of the instant invention having the diameter sizing means confined within an unshirred portion of said tubular casing, is mounted on the sleeve means by the sizing means which is detachably mounted and secured on the sleeve. Emulsion cut-off means are also provided which are disposed at the discharge end of the support tube to control the flow of emulsion into the casing and snubbing means including a snubbing carriage mounting an annular snubbing ring are associated with said stuffing horn assembly and are adapted to be advanced over and retracted from the emulsion cut-off tube. Control means are provided which are operatively associated with the stuffing horn assembly and the snubbing carriage to selectively control a cycle of successive stuffing, clipping and severing operations, thereby producing a stuffed clip closed food product of predetermined length and diameter with a controlled shape of the leading and trailing ends of said product.

More specifically, the apparatus disclosed in copending application Ser. No. 627,252 employs a stuffing horn assembly which includes a central support tube adapted for ready connection to a supply of pressurized meat or other emulsion, typically utilizing a conventional supply hopper and pump system. The central support tube of the horn assembly has an inlet end and a discharge end and serves as a conduit to convey the emulsion from a supply source connected at its inlet end to its discharge end. The stuffing horn assembly is arranged to provide sleeve means including a support sleeve journaled thereon, with the support sleeve being adapted to mount and detachably secure thereto the sizing means implanted in the shirred tubular casing in a manner such that the support sleeve can be reciprocated to manipulate the position of the secured sizing disc while supporting the shirred tubular casing thereon. The stuffing horn assembly also includes emulsion cutoff means disposed at the discharge end of the central support tube to control the flow of emulsion into the casing to be stuffed.

The apparatus also employs snubbing means including a snubbing carriage adapted to be axially aligned with the central support tube of the stuffing horn assembly and adapted to be advanced over and retracted from the emulsion cut-off tube. The snubbing carriage mounts a restraining means, shown in the drawings as an annular snubbing ring, a pair of conventional clip closing means and a severing means. In its retracted position, distally spaced from the stuffing horn assembly, the snubbing carriage is also adapted to be moved transversely from and to the axis of the central support tube to permit loading and securing the prepackaged shirred casing article onto the sleeve means.

Appropriate pneumatic or electro/pneumatic control means are employed to operate the sleeve means upon the central support tube of the horn assembly, and to operate certain elements of the snubbing carriage in combination, to selectively control a cycle of successive stuffing, clipping and severing operations and thereby produce a stuffed clip closed product of predetermined length and diameter, and to selectively control the shape of the leading end and trailing end portions of the product.

For a clearer understanding of the present invention, reference is made to the drawing and particularly FIG. 1 wherein reference number 10 generally designates the prepackaged shirred tubular casing article of the invention. The shirred tubular casing article 10 includes a shirred casing length 12 such as a 150 foot length of Union Carbide Corporation's No. 6 fibrous casing compacted to a length of about 2 feet. The materials from which the casing lengths are manufactured can typically be films fabricated from unsupported cellulose or fibrous reinforced cellulose, polyvinylidene chloride, polyvinylchloride, polyesters, collagen, and polyolefins such as polyethylene or any other suitable material, and can be either single or multilayer films of such film materials.

The shirred tubular casing article 10 also includes a sizing means such as disc 14 which is shown in detail in FIGS. 3A, 3B, 3C and 3D. The sizing disc 14 includes a cylindrical wall 16 having a first end 16a and a second end 16b, and it is provided on its first end 16a with an integral conforming face 18. The sizing means has an outer perimeter larger than the inner perimeter of the unshirred portion 24 of casing length 12 so that the casing length is stretched as it passes over the cylindrical wall 16 of the sizing means. It is preferred that the sizing means be relatively inelastic so that diametric distortion of the sizing means by the force of the casing length against the cylindrical wall 16 is prevented. Moreover, it is also preferred that the outer periphery of the sizing means be continuous or uninterrupted so as to provide equal or even pressure against the contacting unshirred portion of casing length.

The sizing disc 14 is also provided with coacting means which coact with elements on a stuffing horn assembly, e.g. means on the support sleeve of the stuffing apparatus disclosed in application Ser. No. 627,252 to provide locking means which function to lock or secure the shirred tubular casing article 10 to the stuffing horn assembly, e.g. the support sleeve of the stuffing horn assembly. One form of the coacting means is shown in FIGS. 3A, 3B and 3D, and includes a cut-out portion of said face 18 defining a disc aperture 20. The cut-out portion of said face also defines disc aperture recesses 22, which are adapted to be mated with retaining elements such as lugs which are fixedly mounted on the support sleeve shown in drawings of application Ser. No. 627,252. Thus by urging disc aperture recesses 22 into mating relationship with the retaining elements and thereafter twisting the sizing disc 14, a bayonet or twist type locking or securing means is provided, thereby securing the shirred tubular casing article 10 to the support sleeve.

The sizing disc 14 can be fabricated from any material capable of withstanding the stresses imposed upon it during operation. Merely as illustrative, the sizing disc 14 can be fabricated from a metal such as stainless steel or a plastic such as polyethylene, nylon, Teflon and like materials.

As shown in FIGS. 1 and 2, the shirred tubular casing article 10 also includes an unshirred portion 24 of casing length 12 which passes around cylindrical wall 16 and is closed by closure means. The closure means can be a clip 26, which closes the unshirred portion of the casing length a short distance, e.g. 3–5 inches from the front end of the sizing disc. Although a clip is shown as the closure means, it will be obvious that alternate means can be utilized such as string ties, heat seals, knotted deshirred casing and the like. In some cases it is not necessary that the unshirred portion be closed, and advantageously the end constituting the unshirred portion can be tucked into the internal bore.

The prepackaged article can be constructed so as to have self-sustaining characteristics. In order to achieve a self-sustaining character for the prepackaged article, it is important that the inner end 16b of the sizing disc abut or substantially abut the shirred portion of the casing length so that the central axis of the sizing disc is substantially aligned with the central axis of the casing length. If the inner end of the sizing disc is disposed adjacent a substantial amount of unshirred or deshirred portion of casing length, then that portion of the casing length including the sizing disc will "droop" or fall away resulting in a substantial deviation of alignment between the central axis of the disc and the central axis of the casing length.

As shown in FIGS. 1 and 2, the end of the casing length 12 closest to the leading end 28 of the shirred tubular casing article is deshirred and passed over the sizing disc and clip closed. In an alternate technique, the end of casing length 12, i.e. the trailing end, is pulled through the bore of the shirred casing stick, passed over the disc and is clip closed. Thus, referring to FIG. 4, where like parts are designated by like reference numerals, the trailing end 31 is deshirred and passed through the casing stick bore 30 and around the cylindrical wall 16 of sizing disc 14 and is clip closed in the manner explained previously. According to this embodiment, the casing length is caused to deshirr and turn inside-out during stuffing.

As best seen in FIGS. 1 and 2, the prepackaged shirred tubular casing article preferably also includes a retaining overwrap 32 or other means which retains the structural integrity of the shirred casing article 12 and at least partially covers the article. The retaining overwrap can also be disposed in a manner to provide access to the internal bore of the article. Although the overwrap may be a plastic shrink film, other types of protective wraps can be utilized such as non-shrink plastic film, elastic plastic film, cellulose film, cellophane, paper and the like. Alternatively, the article may be confined by means of string, tape, rubber bands or other retaining devices.

The method of forming the article involves inserting a sizing disc into an unshirred opened end portion of a shirred casing length with the longitudinal axis thereof extending transversely to the longitudinal axis of the wall of the casing. After the disc is thus inserted, it is then positioned in central alignment with the shirred casing stick, with the outer peripheral surface of the disc in contact with the inner surface of the unshirred casing wall. The unshirred casing portion may then be clip-closed over the sizing disc as shown in FIG. 1. The composite article is thereafter partially covered with a retaining means which leaves access to bore 30.

As mentioned previously, the shirred tubular casing article of this invention is made to function with the apparatus described in application Ser. No. 627,252. The dimensions of the confined or implanted sizing means in each such shirred casing article is predetermined by the casing manufacturer for each diameter of casing sold for the stuffing system of this invention. Thus the casing sizing disc implanted in each prepackaged shirring casing article, in combination with a restraining means, provides means to control and limit the range allowable for stuffing the casing over or under a recommended predetermined diameter. Advantageously, an operator can thus stuff successive lengths of the same size casing to such predetermined diameter without modifying or adjusting the machine, or with only minor adjustments to compensate for variations in emulsion or casing physical properties. Mixed size prepackaged shirred lengths can be accommodated successively at the will of the operator (when loading a new casing), since each prepackaged casing length is provided with an implanted sizing means having optimum dimensions determined by the casing manufacturer. Mixed casing sizes such as from 101 mm. to 129 mm. stuffed diameter can be utilized without changing apparatus components.

Alternative embodiments and modes of practicing the invention, but within its spirit and scope, will, in the light of this disclosure, occur to persons skilled in the art. It is intended, therefore, that this description be taken as illustrative only and not be construed in any limiting sense.

What is claimed is:

1. A prepackaged shirred tubular casing article comprising a shirred casing length having an internal bore, an unshirred portion and having a sizing means confined within said unshirred portion of said casing length, said sizing means having an outer perimeter larger than the inner perimeter of unstretched unshirred casing length.

2. A prepackaged shirred tubular casing article according to claim 1 including retaining means at least partially covering said article.

3. A prepackaged shirred tubular casing article according to claim 2 wherein said retaining means is disposed in a manner such as to provide access to said internal bore.

4. A prepackaged shirred tubular casing article according to claim 2 wherein said retaining means comprises a protective overwrap.

5. A prepackaged shirred tubular casing article according to claim 1 wherein said sizing means includes a cylindrical wall, a first end of said cylindrical wall and a second end and wherein said first end is provided with an integral conforming circular face.

6. A prepackaged shirred tubular casing article according to claim 5 wherein said second end substantially abuts said shirred casing length to provide a self-sustaining casing article.

7. A prepackaged shirred tubular casing article according to claim 5 wherein said sizing means includes coacting means which coact with elements of a stuffing horn assembly to provide locking means which secure said tubular casing article to said stuffing horn assembly.

8. A prepackaged shirred tubular casing article according to claim 7 wherein said coacting means include cut-out portions of said face defining a disc aperture and disc aperture recesses.

9. A prepackaged shirred tubular casing article according to claim 1 wherein said sizing means has a continuous outer periphery contacting said unshirred portion of said casing length.

10. A prepackaged shirred tubular casing article according to claim 1 wherein said casing length is fabricated from unsupported cellulose.

11. A prepackaged shirred tubular casing article according to claim 1 wherein said casing length is fabricated from fibrous reinforced cellulose.

12. A prepackaged shirred tubular casing article according to claim 1 wherein said casing length is fabricated from polyvinylidene chloride.

13. A prepackaged shirred tubular casing article according to claim 1 wherein said casing length is fabricated from polyethylene.

14. A prepackaged shirred tubular casing article according to claim 1 wherein said unshirred portion is closed adjacent said sizing means.

15. A prepackaged shirred tubular casing article according to claim 14 wherein said unshirred portion is closed by means of a clip.

16. A prepackaged shirred tubular casing article according to claim 1 wherein the end of said casing article furthest from said sizing means is unshirred and passed through said bore and around said sizing means.

17. A prepackaged shirred tubular casing article according to claim 1 wherein said shirred casing length is a compact self-sustaining casing length.

* * * * *